US007281365B2

United States Patent
Zürn et al.

(10) Patent No.: US 7,281,365 B2
(45) Date of Patent: Oct. 16, 2007

(54) CROP GATHERING DEVICE WITH CONVEYOR BELT ASSEMBLY

(75) Inventors: Rolf Zürn, Schöntal (DE); Martin Stahl, Krautheim (DE); Günter Kempf, Krautheim-Gommersdorf (DE)

(73) Assignee: Deere & Company, Moline, IL (US)

( * ) Notice: Subject to any disclaimer, the term of this patent is extended or adjusted under 35 U.S.C. 154(b) by 110 days.

(21) Appl. No.: 10/882,832

(22) Filed: Jul. 1, 2004

(65) Prior Publication Data

US 2005/0022491 A1    Feb. 3, 2005

(30) Foreign Application Priority Data

Jul. 10, 2003    (DE) ................. 103 31 197

(51) Int. Cl.
A01D 43/00    (2006.01)

(52) U.S. Cl. .......................... 56/181; 56/364

(58) Field of Classification Search .......... 56/219, 56/224, 181, 187, 16.1, 212, 14.4, 364
See application file for complete search history.

(56) References Cited

U.S. PATENT DOCUMENTS

| 1,668,330 A | * | 5/1928 | Morse ................. 464/49 |
| 1,729,314 A | | 9/1929 | Weisensel et al. |
| 1,931,416 A | | 10/1933 | Shramm |
| 3,638,408 A | * | 2/1972 | Swanson ................. 56/219 |
| 4,038,809 A | | 8/1977 | Arnould et al. |
| 4,617,787 A | * | 10/1986 | Eguchi et al. ............ 56/14.6 |
| 5,301,496 A | | 4/1994 | Sudbrack et al. |
| 5,423,166 A | | 6/1995 | Scott |
| RE35,543 E | | 7/1997 | Patterson |
| 5,964,081 A | | 10/1999 | Ingram |
| 6,775,969 B2 | * | 8/2004 | Wuebbels et al. ......... 56/208 |
| 6,817,166 B2 | * | 11/2004 | Dunn ................. 56/16.4 R |

FOREIGN PATENT DOCUMENTS

| EP | 1 055 361 A | 5/2000 |
| GB | 1 501 639 A | 12/1974 |
| GB | 1 574 033 A | 4/1977 |
| GB | 1 602 067 A | 5/1978 |
| GB | 1574033 | 9/1980 |
| JP | 06245624 A | * 9/1994 |

OTHER PUBLICATIONS

Canadian search report dated Sep. 20, 2006; 2 pgs.

* cited by examiner

*Primary Examiner*—Thomas B. Will
*Assistant Examiner*—Alicia Torres

(57) ABSTRACT

A harvesting platform comprising a conveyor belt assembly being located rearwardly from a cutter bar. The conveyor belt assembly comprises a first roller and a second roller around which a conveyor belt runs. The rollers are fastened to each other by mounting elements. The conveyor belt assembly is pivotally mounted to the floor of the platform so it can be pivoted upward from the floor.

9 Claims, 5 Drawing Sheets

CROP GATHERING DEVICE WITH CONVEYOR BELT ASSEMBLY

FIELD OF THE INVENTION

The present invention is directed to a crop gathering device having a frame with a floor. A conveyor belt assembly is mounted to the floor and can be pivoted upwardly therefrom.

BACKGROUND OF THE INVENTION

Such crop gathering devices in the form of draper platforms are described in GB 1 501 639 A, GB 1 574 033 A and GB 1 602 067 A. These platforms have a frame with a floor, side walls and a back wall. A transverse auger is arranged in front of the rear wall. Several conveyor belts arranged next to each other laterally are situated above the floor between a cutter bar on the front side of the floor and the transverse auger. The conveyor belts transport the harvested crop rearward to the transverse auger, where it is then released in its middle region to the feeder house of a combine. A rotating reel feeds the upright crop to the cutter bar is situated above the cutter bar and the conveyor belts.

The endless conveyor belts move around front and rear rollers. The rear roller is driven and moves the conveyor belts by friction. Between the two rollers, the lower strand of the conveyor belts lies on the third roller, biased by a spring force downward, which produces sufficient tightening of the conveyor belt. According to GB 1 501 639 A and GB 1 574 033 A, the front and rear rollers each extend over the entire width of the platform, whereas in GB 1 602 067 A, they only extend over the width of the corresponding conveyor belt.

The rollers, and with them the conveyor belts, are rigidly fastened to the frame of the platform. A drawback in the mentioned platforms is therefore considered to be the fact that more effort is required to disassemble the conveyor belts for cleaning, maintenance, or to eliminate jams.

EP 1 055 361 A describes another platform in which lateral conveyor belts feed the crop to the center, where it is conveyed by a third conveyor belt rearward into the combine. The conveyor belts are mounted on their own frames, which can be individually disassembled.

SUMMARY OF THE INVENTION

It is an object of the present invention to provide an improved assembly for maintenance of a crop gathering device having a conveyor belt assembly.

The crop gathering device has a conveyor belt assembly that includes first and second rollers around which a conveyor belt runs. The rollers are connected to each other by mounting elements. The conveyor belt assembly pivots upward on the frame of the crop gathering device.

In this manner, one obtains the possibility of pivoting the conveyor belt assembly upward into a non-operating position in order to clean the bottom and the space beneath it and to perform maintenance on the conveyor belt assembly.

The pivot axis of the conveyor belt assembly preferably coincides with the axis of rotation of a shaft used to drive the conveyor belt or to convey the drive torque from a first conveyor belt assembly to a second conveyor belt assembly. This eliminates the need to separate the drive connection of the shaft before pivoting.

The mentioned pivotability around the longitudinal axis of the shaft can be achieved in that the shaft is mounted to rotate on a mounting element of the conveyor belt assembly. The shaft is also rotatable at another location on the frame of the crop gathering device, for example, on a retaining block. The shaft is therefore rigidly supported on the frame of the crop gathering device and the mounting element can be pivoted with the entire conveyor belt assembly around the axis into a non-operating position. It would also be conceivable in another embodiment to use a short hollow shaft or other support elements which are arranged concentrically to the shaft for rotatable support on the mounting element on the frame of the crop gathering device. The shaft is then mounted on the mounting element or on the frame or on both.

Fixing the conveyor belt assembly in an operating position is achieved by means of a support supporting the mounting element at a distance from the pivot axis. To pivot the conveyor belt assembly, it is sufficient to release the support of the mounting element from the frame. If the aforementioned retaining block on which the shaft is supported is additionally released from the frame, the entire conveyor belt assembly can be disassembled (after separation of the drive and/or power take-off connection of the shaft).

It is also desirable to be able to remove the conveyor belt assembly as simply as possible in order to conduct maintenance on it or to replace the conveyor belt. In order to eliminate the need to manually disassemble the drive connection of the shaft, it serves to connect the shaft to a coupling that has two separable halves. One half of the coupling is connected to the shaft and the other to the drive or power take-off.

Separation of the two halves of the coupling, in principle, can occur in different ways. It would be conceivable to configure the halves so that their connection to each other is separable by movement of a shaft in the radial direction. This type of coupling can be a jaw coupling, having jaws that engage with one another, whose dimensions permit removal of one half in the radial direction. In a preferred embodiment, on the other hand, one half of the coupling is mounted to be movable on the shaft in its axial direction. The half of the coupling mounted to move on the shaft is therefore displaced along the shaft in order to separate the drive connection. The halves of the coupling can be provided with axially oriented jaws that engage with one another and can be disengaged by movement of one half.

This displacement can occur against the force of the spring that biases the halves against each other. The half is then preferably mounted on the shaft in positive-fitting fashion. In this embodiment, the coupling could be designed as a friction coupling that also serves as an overload safety.

In another embodiment, the half of the coupling could be locked on the shaft. The locking is released before separation of the drive connection between the halves of the coupling in order to then move the half on the shaft and finally remove the conveyor belt assembly. Torque transfer between the shaft and half of the coupling occurs in this embodiment by locking and/or positive fitting between the shaft and coupling.

In particular, locking of the half of the coupling on the shaft can be effected by means of a pin that also serves as an overload safety. Other overload safeties, especially couplings, can also be inserted into the drive train of the conveyor belt assembly.

Preferably, the half of the coupling is also fastened removably to the shaft so that it and the elements used to mount the shaft on the frame, for example, a retaining block, can be removed from the shaft. Thus this also facilitates removal and mounting of the conveyor belt on the conveyor belt assembly.

The described releasable couplings can also be used on crop gathering devices whose conveyor belt assembly is not pivotable upward.

The invention can be implemented in many types of crop gathering devices, like windrowers or mowing machines. Preferably, it finds use on platforms for combines. The conveyor belts can be used for transport of the crop, separated by a cutter bar from the ground, in the lateral direction or rearward relative to the forward direction.

DETAILED DESCRIPTION

Figure 1:
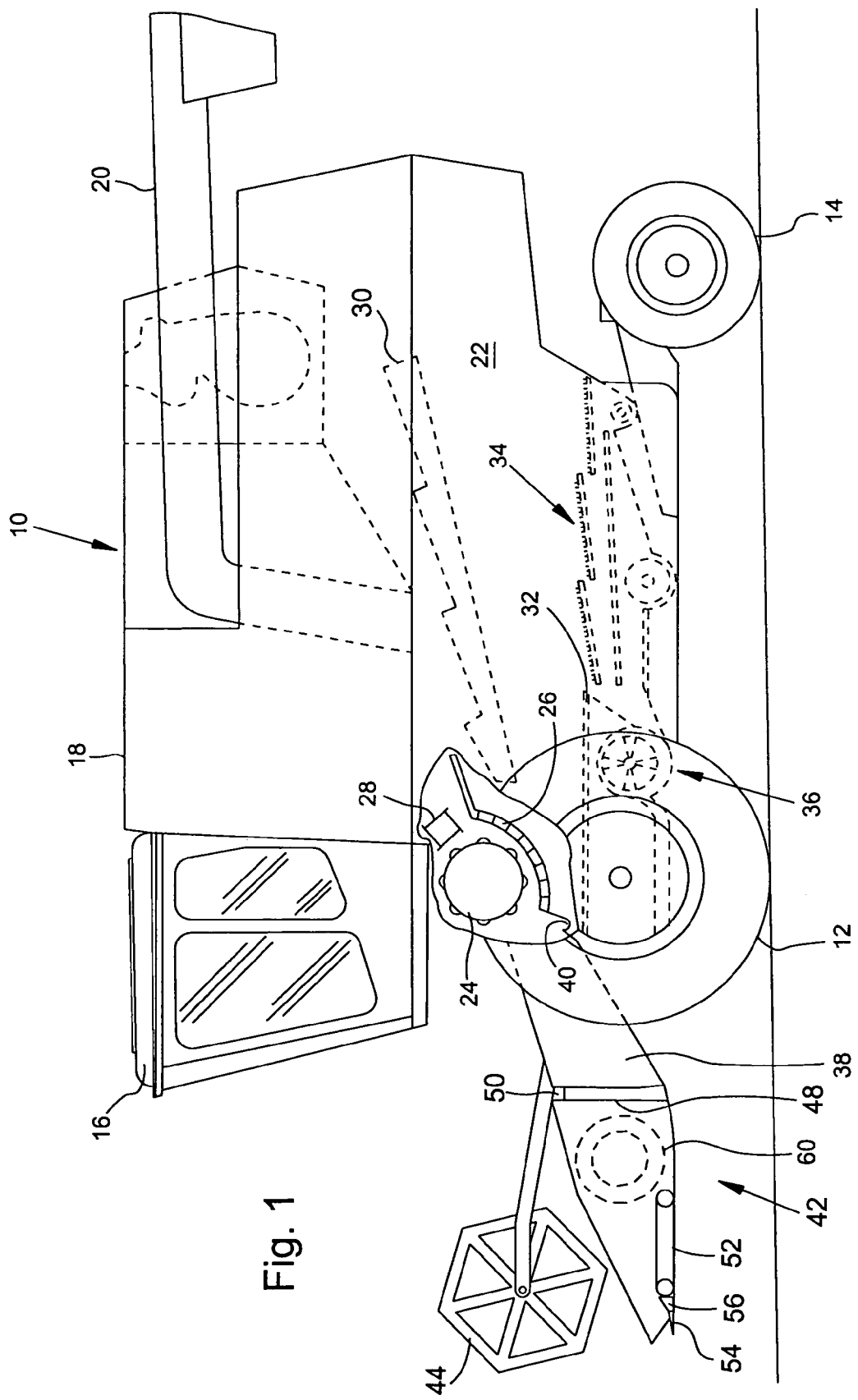
FIG. 1 is a schematic side view of a harvesting machine with a crop gathering device with conveyor belts.

A harvesting machine 10, depicted in FIG. 1 as a combine, is supported on front driven wheels 12 and rear steerable wheels 14 and has an operator's cab 16 from which it can be operated by a driver. A grain tank 18 is located behind the cab 16. Grain can be discharged from the grain tank 18 by a discharge auger 20. The grain tank 18 and cab 16 are mounted on a frame 22. A threshing assembly breaks the harvested crop into its large and small components. The threshing assembly is located within the frame 22 and comprises a threshing cylinder 24, a threshing concave 26, and a beater 28. Further separation of the threshed crop is carried out on straw walkers 30. The small components of the crop are directed to a preparation pan 32 by the threshing assembly and straw walkers 30. Chaff is removed from the small crop components by a cleaning assembly comprising sieves 34 and blower 36. The preparation pan 32 directs the small components to the sieves 34 where it is moved rearwardly. The chaff is blown out the rear of the combine and the grain falls to the floor. The cleaned grain is conveyed into the grain tank 18. The large crop components are deposited on the ground via the straw walkers 30. The crop lying or standing is first picked up or cut by a harvesting platform 42. The harvested crop is directed to a feeder house 38. The feeder house 38 feeds the harvested crop past a stone trap 40 to the threshing assembly 24. The directional terms—front, rear, top, and bottom—refer to the forward direction of travel V of the harvesting machine 10.

Figure 2:
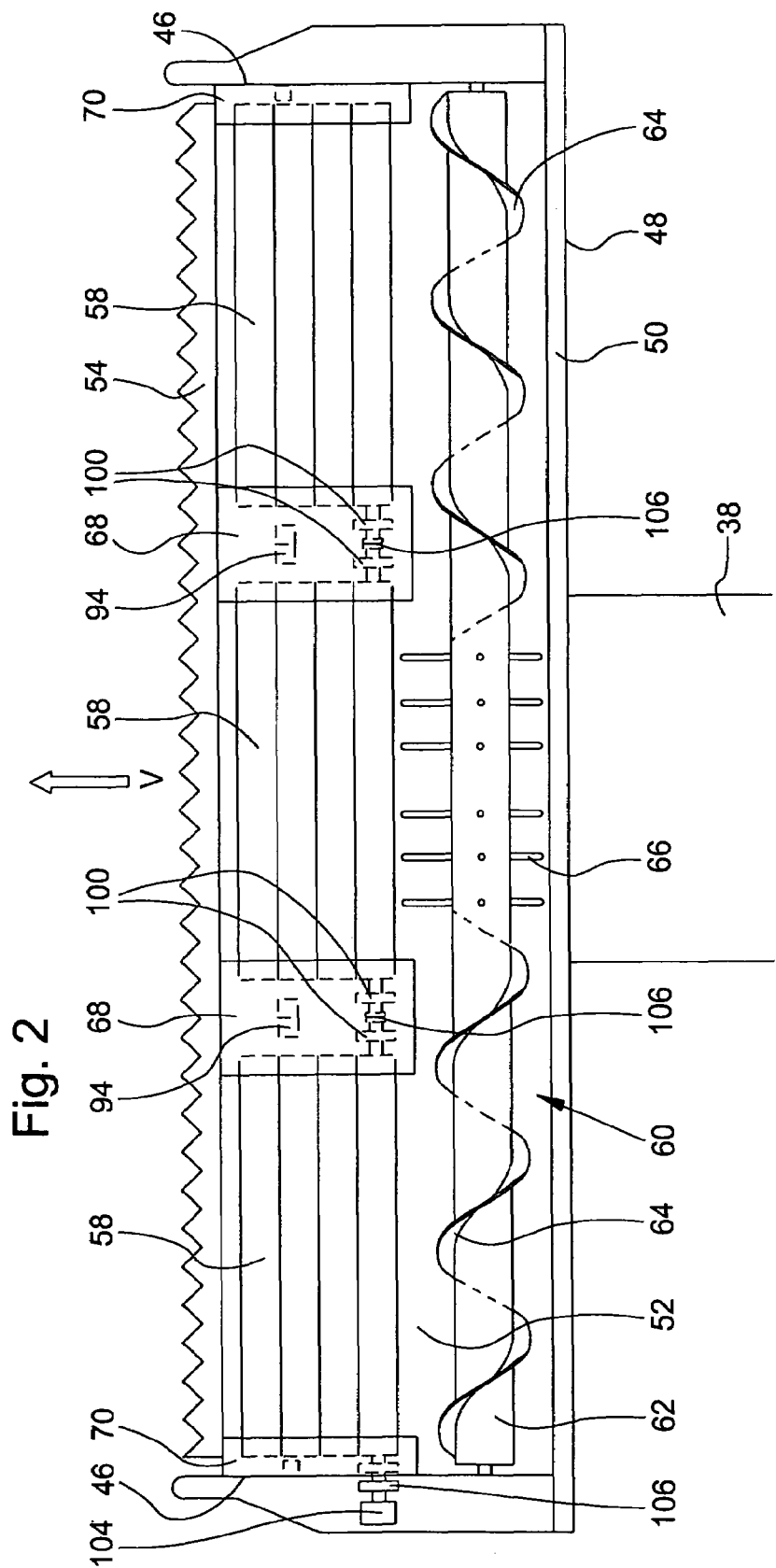
FIG. 2 is a top view of the crop gathering device.

The platform 42 includes a frame comprising side walls 46, a rear wall 48, a cross arm 50 arranged on top of the rear wall 48, and a bottom 52. The center region of the cross arm 50 is detachably suspended by appropriate means, for example, hooks, on the feeder house 38. A cutter bar 54 with its blades moving back and forth is arranged on the front of the bottom 52. A ramp 56 rising slightly rearward and extending over the width of the platform 42 is situated behind the cutter bar 54 and is rigidly connected to bottom 52. Behind ramp 56 three conveyor belt assemblies 58 are arranged next to each other to convey the cut crop rearwardly. The conveyor belt assemblies direct the cut crop to a transverse auger 60. The transverse auger 60 is comprises a tube 62 with conveyor helix 64 welded to it, and controlled pull-in fingers 66 provided in its middle region. In principle, the number of conveyor belt assemblies 58 is arbitrary, so that both more or fewer than the three conveyor belt assemblies depicted could be used. A reel 44, not drawn in FIG. 2 to improve clarity, extends across frame and is mounted to be adjustable in height and movable in the forward direction relative to the frame. The reel 44 is situated above the cutter bar 54 and the conveyor belt assembly 58.

Covers 68 cover the lateral edge regions of adjacent conveyor belt assemblies 58, are arranged above the intermediate regions between the outer conveyor belt assemblies 58. Similar covers 70 are also situated between the side wall 46 and the outer edges of the outermost conveyor belt assemblies 58. The covers 70 are detachably fastened to the bottom, preferably by studs. They prevent accumulation of the crop and other contaminants inside the conveyor belt assemblies 58.

Figure 3:
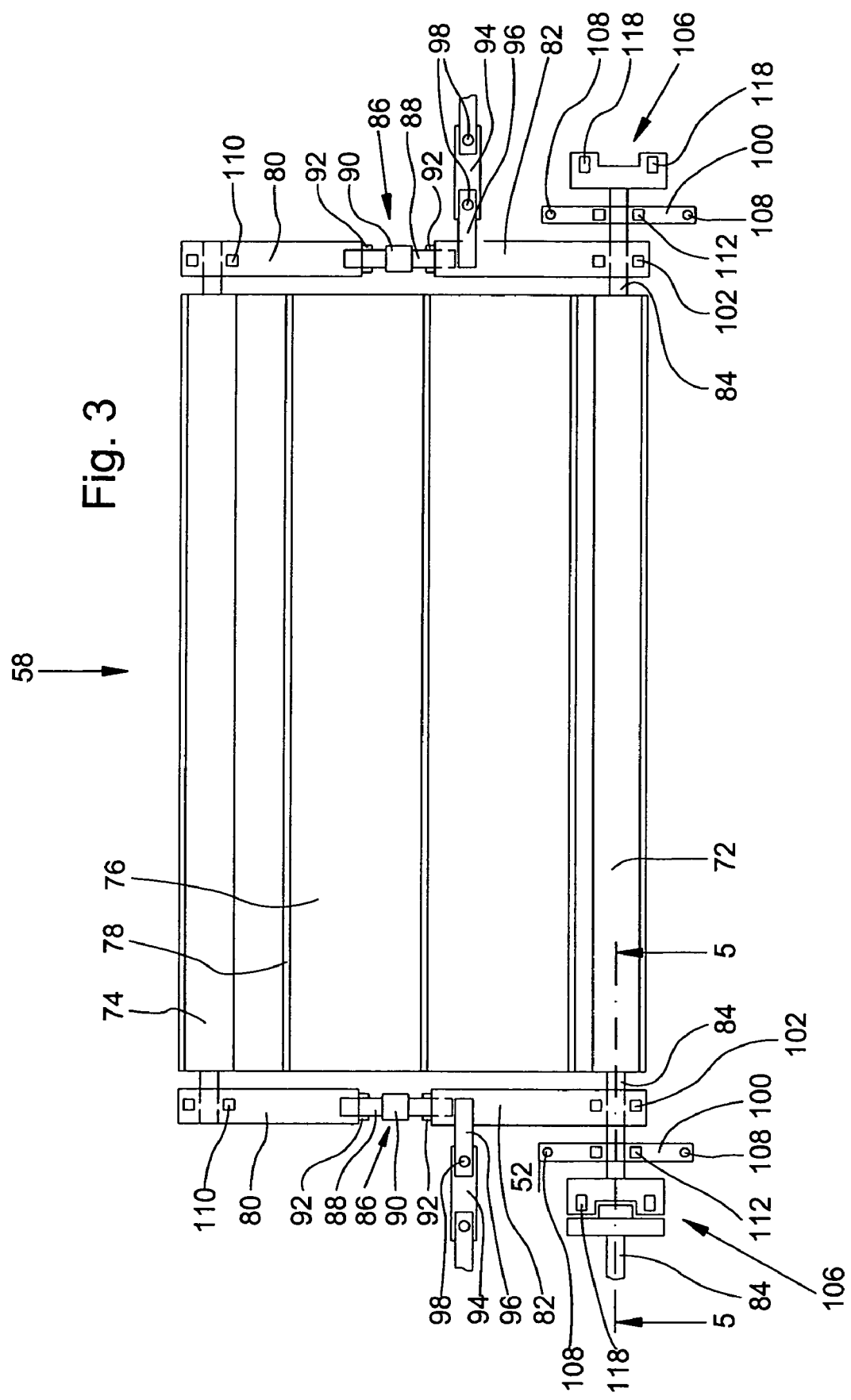
FIG. 3 is a top view of the conveyor belt assembly.

FIG. 3 shows an individual conveyor belt assembly 58 in more detail. It comprises a first, rear cylindrical roller 72 and a second, front cylindrical roller 74, around which an endless conveyor belt 76 runs. The conveyor belt 76 is provided with outwardly protruding ribs 78 having a rectangular cross section. In the illustrated embodiment, the surface between the ribs 78 is smooth. In other embodiments, other surfaces, for example, roughened or corrugated surfaces, and other cross-sectional shapes and spacings of the ribs 78 could be chosen. The conveyor belt 76 is formed from a flexible material, like rubber or an appropriate plastic.

The conveyor belt assembly 58 also includes a mounting frame that comprises two front mounting elements 80 and two rear mounting elements 82. The front roller 74 is mounted to rotate at its respective two ends in the front mounting element 80. Similarly, the rear roller 72 is equipped on both ends with a shaft 84 (or a single continuous shaft 84, onto which the roller 72 is pushed), which extends through the two rear mounting elements 82 and is mounted to rotate therein. Support of the front roller 74 on the front mounting element 80 is effected by roller bearing 110, and support of shaft 84 of the rear roller 72 on the rear mounting element 82 by roller bearing 102.

The front mounting elements 80 are each connected to the rear mounting elements 82 by an adjustment mechanism 86. The adjustment mechanism 86 provides tension adjustment of the conveyor belt 76 and achieves straight running of the conveyor belt 76. The adjustment mechanism 86 comprises a threaded rod 88 with opposite threads that extend into a threaded hole in the mounting elements 80, 82. A hexagon 90 rigidly mounted on it permits rotation of the threaded rod 88 and therefore loosening or tightening of the mounting elements 80 and 82. Lock-nuts 92 permit fastening of the threaded rod 88 to the mounting elements 80 and 82, so that rigid fastening of the mounting elements 80 and 82 to each other is possible. The adjustment mechanism 86 also permits disassembly of the conveyor belt 76, in which case the latter is first loosened by adjusting the threaded rod 88. The conveyor belt 76 can then be withdrawn laterally from the conveyor belt assembly 58. It would also be conceivable to replace the fairly simple adjustment mechanism 86 with a mechanism that pre-tensions rollers 72 and 74 relative to each other by means of a spring. An appropriate mechanism is disclosed in EP 1 055 361 A. A third roller, biased downward by spring force, could also be provided to tighten the conveyor belt 76. Removal of the conveyor belt 76 is simplified by such a spring bias, since the conveyor belt 76 can then be removed against the spring bias.

Figure 5:
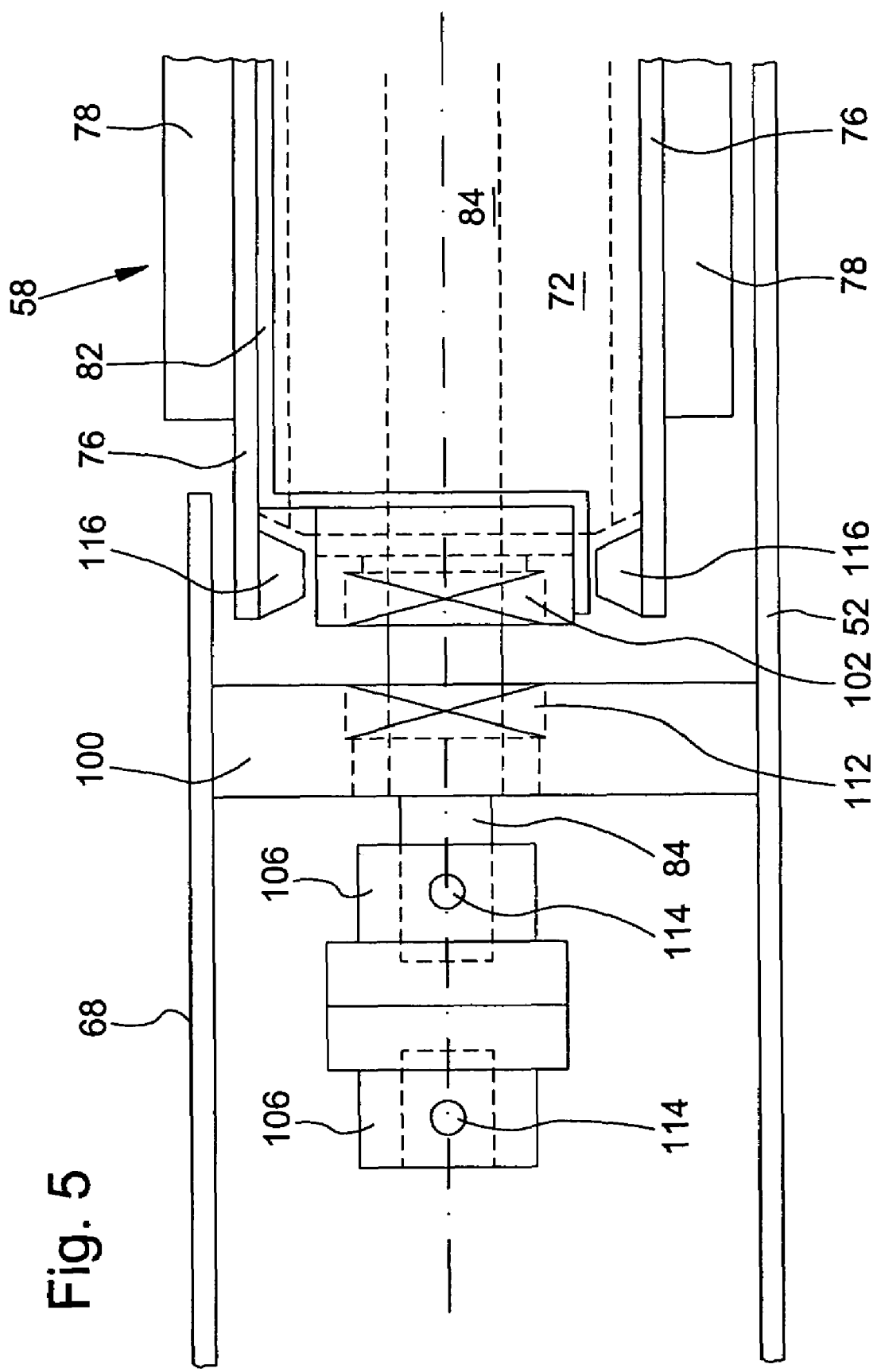
FIG. 5 is a cross sectional view taken along line 5-5 in FIG. 3.

It should be noted that the mounting elements 80 and 82, differently from what is shown in FIG. 3, are arranged completely inside the width of conveyor belt 76, i.e., the conveyor belt 76 extends beyond the width of rollers 72 and 74, as is shown in FIG. 5.

The two front mounting elements 80 are generally connected to each other by a cross arm that is not drawn in FIG. 3. Preferably, another cross arm also connects the two rear mounting elements 80 of the conveyor belt assembly 58.

Support of the retaining elements 80 and 82 on the bottom 52 of platform 42 occurs at four sites. Viewed in the forward direction V, a front retaining block 94 is fastened on bottom 52 roughly in the center of the conveyor belt assembly 58, between two adjacent conveyor belt assemblies 58, or between a side wall 46 and the conveyor belt assembly 58 arranged next to it. A strut 96 attached to the top of the rear retaining element 82 extends laterally outward from it and rests against the top of the front retaining block 94, where it is detachably fastened by a screw 98.

In addition, rear retaining blocks 100 extending in the forward direction V are fastened to bottom 52 in the vicinity of the rear end of the rear retaining element 82. The shafts 84 of the rear roller 72 extend through roller bearings 102, which are arranged in corresponding openings in the rear retaining elements 82, and are also seated in roller bearings 112 that are situated in corresponding openings in the rear retaining blocks 100. The shafts 84 extend beyond the rear retaining blocks 100 outward. Fastening of the rear retaining elements 82 to bottom 52 is effected via roller bearings 102, shaft 84, roller bearings 112 and finally retaining blocks 100.

Figure 4:
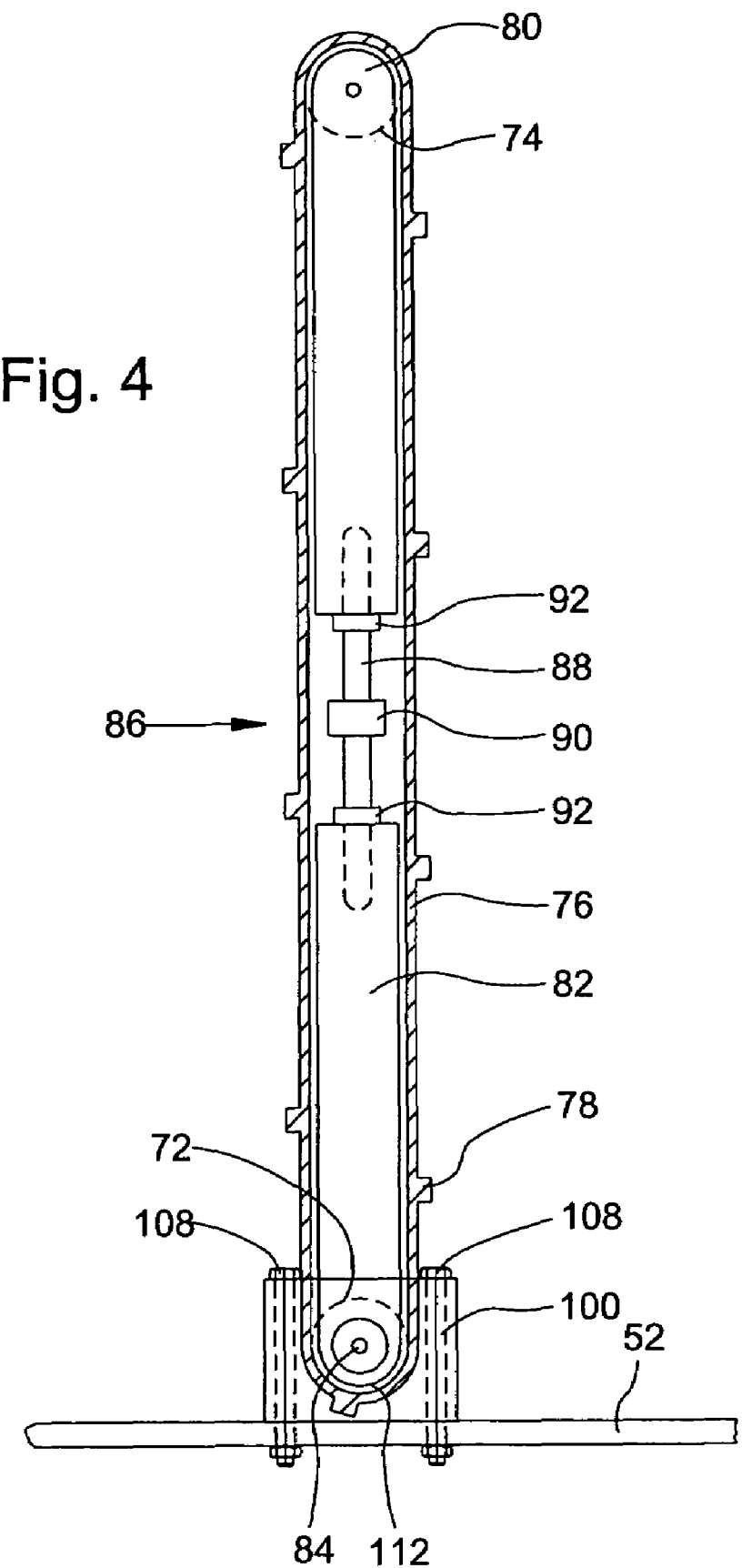
FIG. 4 is a lateral view of the conveyor belt assembly in its upward pivoted position.

In this way, the rear retaining elements 82 are mounted to rotate on the shaft 84 around the longitudinal axis by means of roller bearings 102 which, after removal of the screws 98 from the front retaining blocks 94 permits the conveyor belt assembly 58 as a whole to be pivoted around the rotational axis of shafts 84 into the position depicted in FIG. 4. The adjacent covers 68 and 70 must naturally, be removed beforehand, by removing the screws that secure the covers 68 and 70 to the retaining blocks 94 and 100, and ramp 56. Cleaning and maintenance work is significantly facilitated with the conveyor belt assemblies 58 pivoted upward.

Drive of the conveyor belt 74 is effected by means of the hydraulic motor 104. The hydraulic motor 104 is driven by a separate hydraulic circuit of the platform 42. A purely mechanical drive of the combine 10 is also conceivable, or else a hydraulic drive via the combine hydraulics or a drive using hydraulic oil from the combine and a pump connected to the platform 42, as described in EP 1 055 359 A. The speed of the hydraulic motor 104 can be fixed or controlled by an operator. It can also depend on the driving speed of combine 10.

The hydraulic motor 104 drives the rear roller 72 of the left conveyor belt assembly 58 via a jaw coupling 106 that engages the left end of shaft 84 of this conveyor belt assembly 58. The rear roller 72 of the left conveyor belt assembly 58 also drives the left end of shaft 84 of the middle conveyor belt assembly 58 via the right end of shaft 84 and another jaw coupling 106. The rightmost conveyor belt assembly is driven in a similar manner. The jaw couplings 106 have two halves, each provided with jaws that engage between the jaws of the other half. Damping elements 118 made of an elastic material are arranged between the jaws of the halves in order to be able to compensate for drive torque peaks, for example, during startup. The jaw couplings 106 are configured so that torque transfer occurs when the shafts 84 connected to the jaw couplings 106 rotate. The jaw couplings 106 permit separation of the two halves in the radial direction. The jaws can therefore be disengaged when one half is moved in the longitudinal direction of shafts 84 relative to the other half. The jaw couplings 106 are also removable from shafts 84, so that the shafts 84 can be pushed during assembly through the roller bearings 102 and 112 into the rear retaining elements 82 and into the rear retaining block 100. For this purpose, hollow split pins 114 are provided according to FIG. 5, which extend through radial holes aligned with each other in the shaft 84 and in the corresponding half of the jaw coupling 106. The hollow split pins 114 also serve as a mechanical overload safety, since they shear off when a limit torque is surpassed in the drive train of the conveyor belt 76, for example, during penetration of a foreign object (stone) between the conveyor belt 76 and the bottom 52 of the platform 42. The hollow split pins 114 can also be replaced by spring retainer bolts. The hollow split pins 114, which are removable by means of a hammer and a punch also make it possible to remove the half of the jaw coupling 106 and the retaining block 100 from shaft 84, so that the conveyor belt 78 can be removed from the conveyor belt assembly 58.

By using the described jaw coupling 106, it is possible to disassemble the conveyor belt assembly 58 after the screws 98, and the additional screws 108 that attach the rear mounting blocks 100 to bottom 52, are removed. The only connection then remaining to the other platform 42 is realized by jaw couplings 106, whose halves are separable from each other on both sides of the conveyor belt assembly 58 by removal of the hollow split pins 114 and displacement of one of the halves in the longitudinal direction of shaft 84. Reassembly occurs in the opposite sequence. This enables to disassembly of individual conveyor belt assemblies 58 for maintenance or cleaning purposes without requiring disassembly of the other conveyor belt assemblies 58.

The vertical section, depicted in FIG. 5, through the retaining block 100, the adjacent part of the conveyor belt assembly 58, and the jaw coupling 106 shows that wedge guides 116 arranged on the inside of conveyor belt 76 extend laterally over the rear roller 72. They prevent the conveyor belt 76 from slipping off rollers 72, 74.

Having described the illustrated embodiment, it will become apparent that various modifications can be made without departing from the scope of the invention as defined in the accompanying claims.

The invention claimed is:

1. A crop gathering device, equipped to be moved over a field and to harvest a crop, comprising a frame having a floor and at least one conveyor belt assembly mounted on the frame to convey a harvested crop, the conveyor belt assembly comprises a first roller and a second roller around which a conveyor belt runs, the first and second rollers being fastened to each other by mounting elements, characterized by the fact that the conveyor belt assembly is mounted to be pivoted upward from the floor of the frame about a pivot axis, wherein the first roller is connected to a shaft for driving the conveyor belt assembly, and further wherein the mounting elements are supported on the shaft to pivot the conveyor belt assembly about the pivot axis, wherein the shaft defines a rotational axis, and the conveyor belt assembly can be pivoted around the rotational axis of the shaft, wherein the first roller is connected to a drive via a separable coupling, and wherein the coupling is a jaw coupling.

2. The crop gathering device as defined by claim 1 wherein the shaft is mounted to rotate on one of the mounting elements, and the shaft is also supported rotatably on the frame.

3. The crop gathering device as defined by claim 1 wherein the shaft is mounted to rotate on a retaining block that is releasably fastened to the frame.

4. crop gathering device as defined by claim 1 wherein conveyor belt assembly is releasably supported on the frame by one of the mounting elements spaced from the pivot axis of the conveyor belt assembly.

5. The crop gathering device as defined by claim 1 wherein a cutter bar is arranged on the front of frame, and that several conveyor belt assemblies are provided to convey the crop into a harvesting machine.

6. The crop gathering device as defined by claim 5 wherein the several conveyor belt assemblies are arranged laterally adjacent to each other and convey a harvested crop rearwardly to direct the harvested crop to a transverse auger.

7. A crop gathering device, equipped to be moved over a field and to harvest a crop, comprising a frame having a floor and at least one conveyor belt assembly mounted on the frame to convey a harvested crop, the conveyor belt assembly comprises a first roller and a second roller around which a conveyor belt runs, the first and second rollers being fastened to each other by mounting elements, characterized by the fact that the conveyor belt assembly is mounted to be pivoted upward from the floor of the frame about a pivot axis, wherein the first roller is connected to a shaft for driving the conveyor belt assembly, and further wherein the mounting elements are supported on the shaft to pivot the conveyor belt assembly about the pivot axis, wherein the shaft defines a rotational axis, and the conveyor belt assembly can be pivoted around the rotational axis of the shaft, wherein the first roller is connected to a drive via a separable coupling, and wherein half of the coupling is mounted displaceably on shaft.

8. The crop gathering device as defined by claim 7 wherein half of the coupling is lockable on shaft.

9. The crop gathering device as defined by claim 8 wherein the half of the coupling that is lockable is locked by a pin that also serves as an overload safety on shaft.

* * * * *